United States Patent
Chu et al.

(10) Patent No.: US 10,437,292 B2
(45) Date of Patent: Oct. 8, 2019

(54) PROTECTION COVER AND ELECTRONIC APPARATUS

(71) Applicants: Shu-Hsien Chu, Taipei (TW); Yu-Wen Cheng, Taipei (TW); Ming-Chung Liu, Taipei (TW)

(72) Inventors: Shu-Hsien Chu, Taipei (TW); Yu-Wen Cheng, Taipei (TW); Ming-Chung Liu, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 15/986,818

(22) Filed: May 23, 2018

(65) Prior Publication Data
US 2018/0341294 A1 Nov. 29, 2018

Related U.S. Application Data

(60) Provisional application No. 62/509,748, filed on May 23, 2017.

(51) Int. Cl.
*G06F 1/16* (2006.01)

(52) U.S. Cl.
CPC .......... *G06F 1/1679* (2013.01); *G06F 1/1626* (2013.01); *G06F 1/1671* (2013.01); *G06F 2200/1633* (2013.01); *G06F 2200/1636* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,796,575 A | * | 8/1998 | Podwalny | G06F 1/1626 361/679.27 |
| 7,054,441 B2 | * | 5/2006 | Pletikosa | G06F 1/1626 361/679.24 |
| 7,609,512 B2 | * | 10/2009 | Richardson | G06F 1/1626 361/679.41 |
| 7,907,394 B2 | * | 3/2011 | Richardson | G06F 1/1613 312/223.1 |
| 8,416,217 B1 | | 4/2013 | Eriksson et al. | |

(Continued)

FOREIGN PATENT DOCUMENTS

| | | |
|---|---|---|
| CN | 206378766 | 8/2017 |
| TW | M458647 | 8/2013 |

(Continued)

OTHER PUBLICATIONS

"Office Action of Taiwan Counterpart Application," dated Sep. 20, 2018, pp. 1-7.

*Primary Examiner* — Lisa Lea-Edmonds
(74) *Attorney, Agent, or Firm* — JCIPRNET

(57) ABSTRACT

Provided is a protection cover, applicable to an electronic device. The protection cover includes a cover body and at least one sensing module. The cover body has a view window, wherein the cover body is suitable for covering a display surface of the electronic device and exposing a part of the display surface via the view window. The at least one sensing module is provided on the cover body and aligns with the view window, wherein the at least one sensing module is suitable for sensing at least one object in the view window to generate a touch signal, and transmitting the touch signal to the electronic device.

18 Claims, 5 Drawing Sheets

(56) References Cited

U.S. PATENT DOCUMENTS

| | | | |
|---|---|---|---|
| 8,644,011 B2* | 2/2014 | Parkinson | B29C 33/485 |
| | | | 224/191 |
| 8,760,364 B2* | 6/2014 | Kim | G06F 1/1616 |
| | | | 345/1.2 |
| 8,767,385 B2* | 7/2014 | Richardson | G06F 1/1626 |
| | | | 361/679.3 |
| 8,792,232 B2* | 7/2014 | Richardson | G06F 1/1626 |
| | | | 361/679.3 |
| 9,112,956 B2* | 8/2015 | Huang | H04B 1/3888 |
| 9,134,762 B2* | 9/2015 | Del Toro | G06F 1/1628 |
| 9,256,291 B2* | 2/2016 | Won | G06F 3/017 |
| 9,310,905 B2* | 4/2016 | Luo | G06F 3/041 |
| 9,560,435 B2* | 1/2017 | Richardson | G06F 1/1626 |
| 9,729,184 B2* | 8/2017 | Lee | H04B 1/3888 |
| 9,904,314 B2* | 2/2018 | Tokutake | G06F 1/1628 |
| 9,952,629 B2* | 4/2018 | Chae | G06F 1/1677 |
| 9,989,994 B2* | 6/2018 | Jeon | G06F 1/1626 |
| 10,055,813 B2* | 8/2018 | Lee | G06T 3/0006 |
| 10,058,154 B2* | 8/2018 | Jo | A45C 11/00 |
| 10,075,579 B2* | 9/2018 | Won | G06F 1/165 |
| 2009/0080153 A1* | 3/2009 | Richardson | H05K 5/0017 |
| | | | 361/679.56 |
| 2014/0128131 A1* | 5/2014 | Sin | H04M 1/185 |
| | | | 455/575.8 |
| 2014/0223551 A1* | 8/2014 | Lin | G06F 21/44 |
| | | | 726/19 |
| 2015/0154935 A1* | 6/2015 | Won | G09G 5/006 |
| | | | 345/156 |
| 2016/0109936 A1* | 4/2016 | Lee | G06F 1/3265 |
| | | | 345/156 |
| 2016/0335980 A1* | 11/2016 | Lee | H04M 1/0243 |

FOREIGN PATENT DOCUMENTS

| | | |
|---|---|---|
| TW | 201349979 | 12/2013 |
| TW | 201630503 | 8/2016 |

* cited by examiner

PROTECTION COVER AND ELECTRONIC APPARATUS

CROSS-REFERENCE TO RELATED APPLICATION

This application claims the priority benefit of U.S. provisional application Ser. No. 62/509,748, filed on May 23, 2017. The entirety of the above-mentioned patent application is hereby incorporated by reference herein and made a part of this specification.

BACKGROUND OF THE INVENTION

1. Field of the Invention

The present invention relates to a protection cover and an electronic apparatus, in particular, to a protection cover having a view window and an electronic apparatus having the protection cover.

2. Description of Related Art

As the technology is changing rapidly, the variety of portable electronic becomes more and more diverse, such as notebooks or tablet PCs. Compared with traditional desktop PCs, the portable electronic devices are best advantageous in that they are suitable for being carried around by users. In a process of carrying the portable electronic devices, in order to prevent the portable electronic devices from being hit or worn, the portable electronic devices may be externally provided with protection sleeves or protection covers.

However, when information is displayed on display surfaces of the portable electronic devices, the users cannot directly view the information content since the information content is covered by the protection sleeves or the protection covers. The users need to open the protection sleeves or the protection covers to view the information on screens and perform touch operations, thereby bringing inconvenience in use.

SUMMARY OF THE INVENTION

The present invention provides a protection cover and an electronic apparatus, being capable of improving the use convenience of electronic devices.

The protection cover in the present invention is applicable to an electronic device. The protection cover includes a cover body and at least one sensing module. The cover body has a view window, wherein the cover body is suitable for covering a display surface of the electronic device and exposing a part of the display surface via the view window. The at least one sensing module is provided on the cover body and aligns with the view window, wherein the at least one sensing module is suitable for sensing at least one object in the view window to generate a touch signal, and transmitting the touch signal to the electronic device.

The electronic apparatus in the present invention includes an electronic device and a protection cover. The electronic device has a display surface. The protection cover includes a cover body and at least one sensing module. The cover body has a view window, wherein the cover body is suitable for covering the display surface of the electronic device and exposing a part of the display surface via the view window. The at least one sensing module is provided on the cover body and aligns with the view window, wherein the at least one sensing module is suitable for sensing at least one object in the view window to generate a touch signal, and transmitting the touch signal to the electronic device.

In an embodiment of the present invention, the at least one sensing module is an infrared sensing module or an ultrasonic sensing module.

In an embodiment of the present invention, the cover body includes a main body and a light-transmitting plate, the main body having an opening, and the light-transmitting plate being provided in the opening to constitute the view window.

In an embodiment of the present invention, the opening includes two sensing spaces located on two opposite sides of the light-transmitting plate respectively, the at least one sensing module being corresponding to at least one of the two sensing spaces.

In an embodiment of the present invention, the number of the at least one sensing module is two, the two sensing modules being corresponding to the two sensing spaces respectively.

In an embodiment of the present invention, the cover body includes two opposite coverage layers, the at least one sensing module being provided between the two coverage layers.

In an embodiment of the present invention, the cover body further includes a frame portion, the frame portion being provided between the two coverage layers and surrounding the view window.

In an embodiment of the present invention, the frame portion has at least one slot, the at least one slot aligning with the at least one sensing module, and the at least one sensing module being suitable for sensing the at least one object in the view window through the at least one slot.

In an embodiment of the present invention, the cover body includes a first block, a second block and a flexible portion, the flexible portion being connected between the first block and the second block, the view window being located on the first block, and the first block being suitable for bending relative to the second block via the flexible portion and overlapping with the second block.

In an embodiment of the present invention, the protection cover includes a keyboard module, wherein the keyboard module is provided on the cover body.

Based on the foregoing, the protection cover in the present invention has a view window and a sensing module corresponding to the view window, so that a user may view information on a display surface of an electronic device through the view window without turning over the protection cover, and a touch operation performed on the view window by the user may be sensed via the sensing module, thereby improving the use convenience of the electronic device.

In order to make the aforementioned and other objectives and advantages of the present invention comprehensible, embodiments accompanied with figures are described in detail below.

DESCRIPTION OF THE EMBODIMENTS

Figure 1:
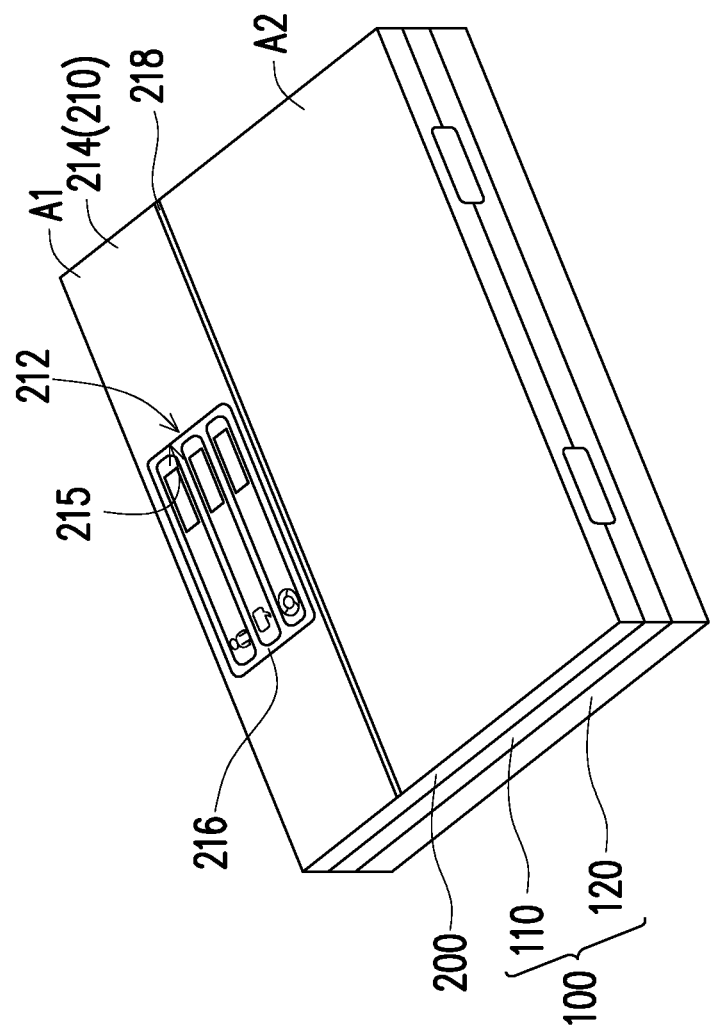
FIG. 1 is a three-dimensional view of an electronic apparatus according to an embodiment of the present invention.
Figure 2:
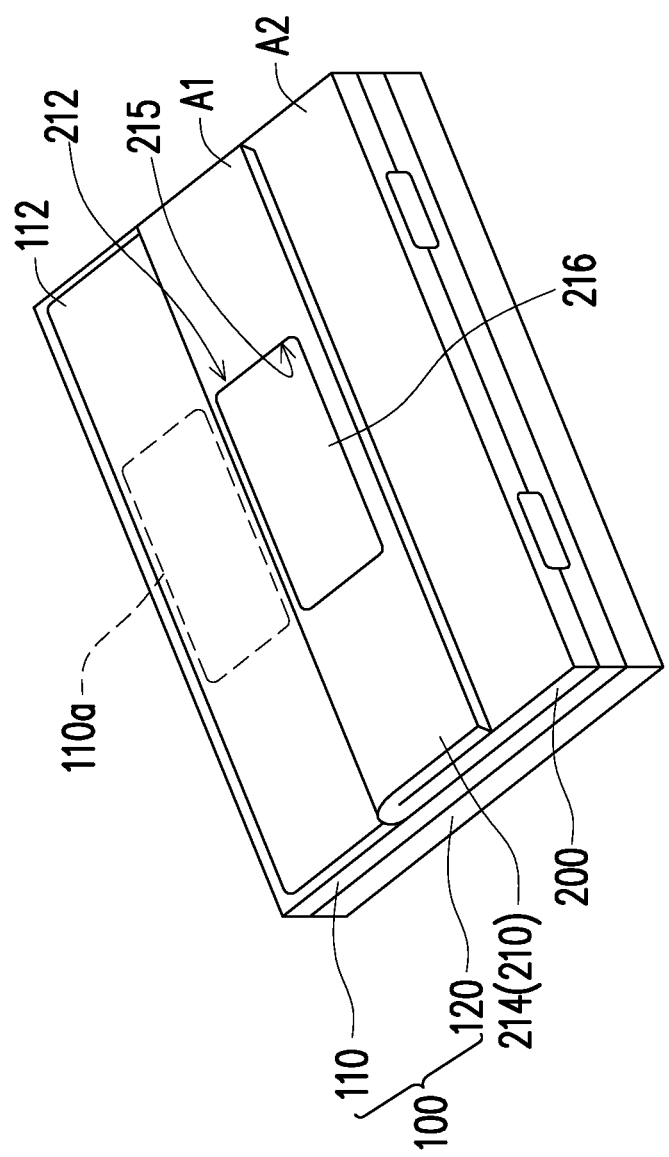
FIG. 2 shows bending of a protection cover in FIG. 1.
Figure 3:
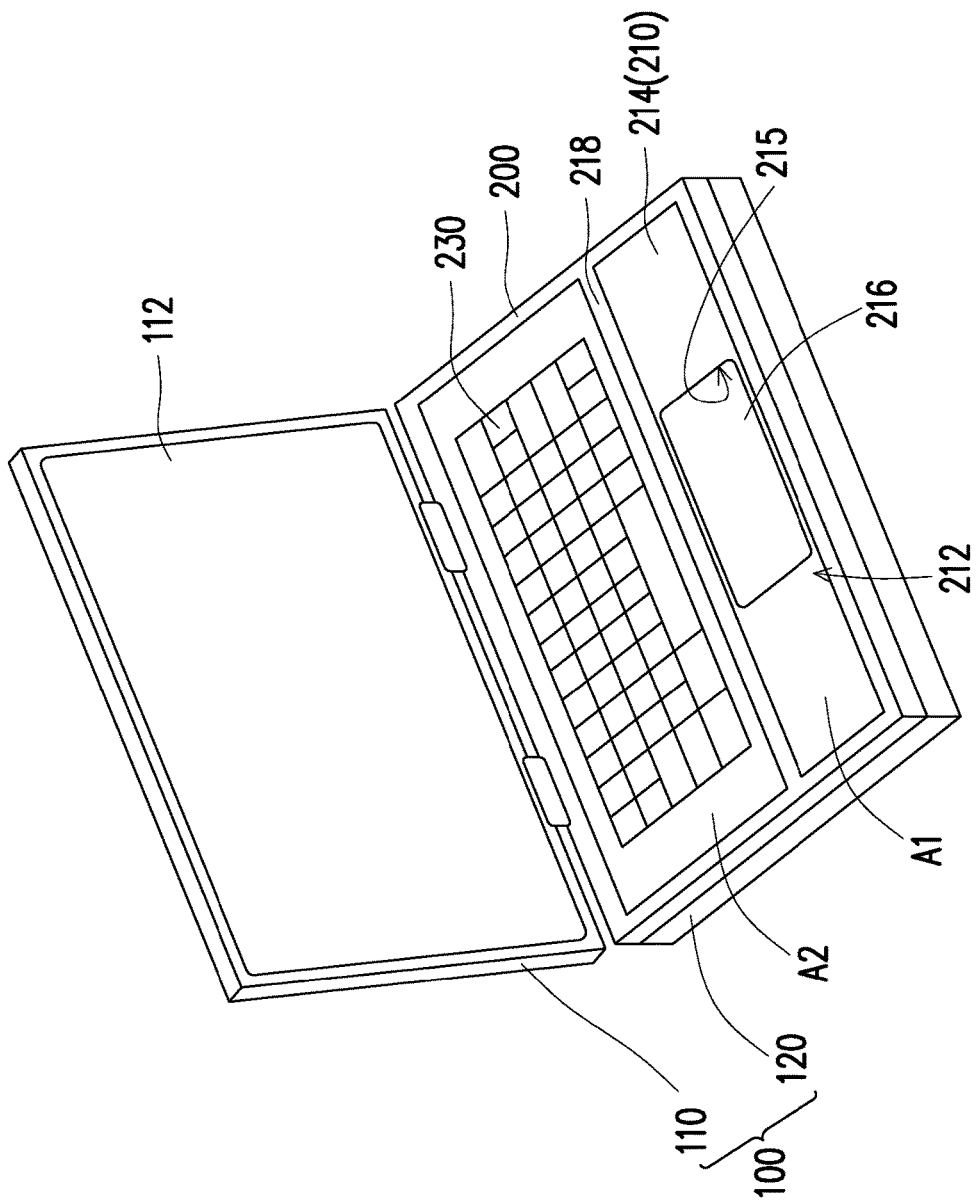
FIG. 3 shows covering of the protection cover in FIG. 1 over a main unit.

FIG. 1 is a three-dimensional view of an electronic apparatus according to an embodiment of the present invention. FIG. 2 shows bending of a protection cover in FIG. 1. FIG. 3 shows covering of the protection cover in FIG. 1 over a main unit. Referring to FIG. 1 to FIG. 3, an electronic apparatus 10 in the present embodiment includes an electronic device 100 and a protection cover 200. A notebook is adopted as the electronic device 100 shown in the present embodiment. Therefore, the electronic device 100 includes a display 110 and a main unit 120, the display having a display surface 112. FIG. 1 shows that the protection cover 200 covers the display surface 112 of the display 110 of the electronic device 100 and the main unit 120 is turned over to the back surface of the display 110. FIG. 2 shows that the protection cover 200 bends and exposes a part of the display surface 112. FIG. 3 shows that the display 110 is unfolded on the main unit 120 and the protection cover 200 covers the main unit 120. In a non-shown embodiment, the electronic device is, for example, a portable electronic device such as a smart phone or a tablet PC, which is not limited herein.

Figure 4:
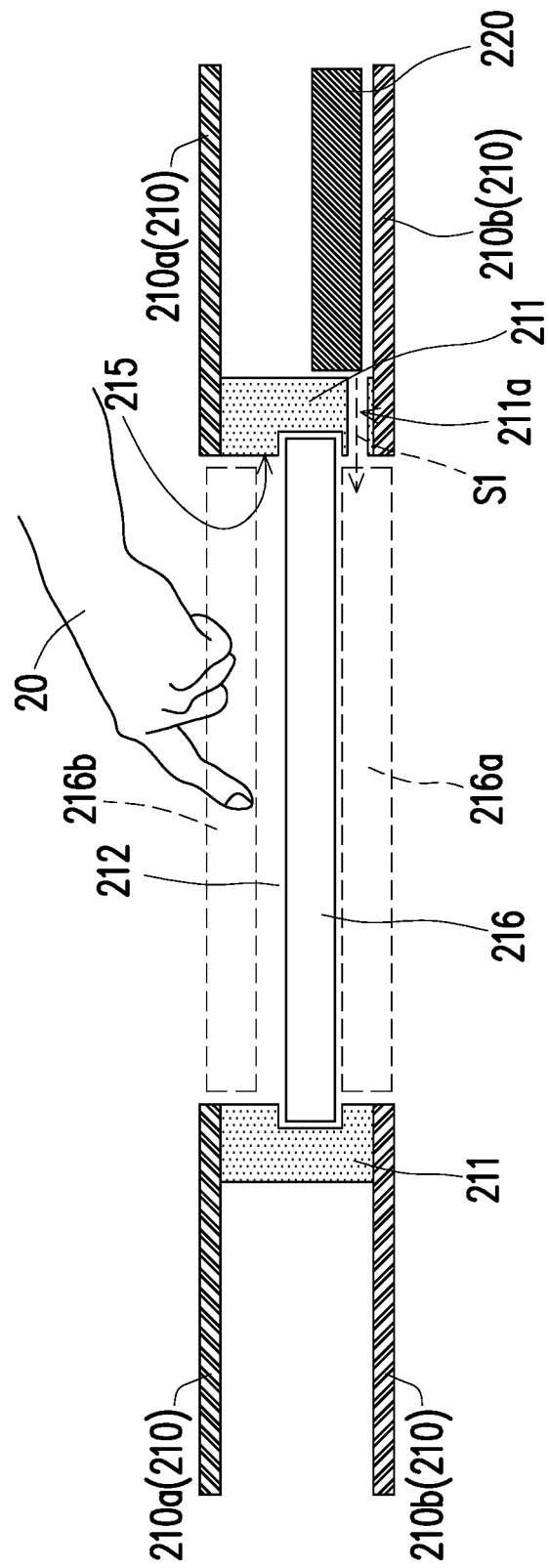
FIG. 4 is a cross-sectional view of the protection cover in FIG. 2.

FIG. 4 is a cross-sectional view of the protection cover in FIG. 2. Referring to FIG. 1, FIG. 2 and FIG. 4, in particular, the protection cover 200 includes a cover body 210 and a sensing module 220. The cover body 210 has a view window 212, the cover body 210 being suitable for covering the display surface 112 of the electronic device 100 and exposing a part 110a (shown in FIG. 2) of the display surface 112 via the view window 212. The sensing module 220 is provided on the cover body 210 and aligns with the view window 212, the sensing module 220 being suitable for sensing at least one object 20 (such as a finger of a user) in the view window 212 to generate a touch signal S1, and transmitting the touch signal S1 to the electronic device 100. That is, the view window 212 becomes a touch pad by the provision of the sensing module 220.

The protection cover 200 in the present embodiment has, as mentioned above, the view window 212 and the sensing module 220 corresponding to the view window 212, so that a user may view information on the display surface 112 of the electronic device 100 through the view window 212 without turning over the protection cover 200, thereby improving the use convenience of the electronic device 100.

Referring to FIG. 1 and FIG. 2, the cover body 210 in the present embodiment includes a first block A1, a second block A2 and a flexible portion 218. The flexible portion 218 is connected between the first block A1 and the second block A2, the view window 212 is located on the first block A1, and the first block A1 is suitable for bending relative to the second block A2 via the flexible portion 218 and overlapping with the second block A2 (as shown in FIG. 2). The user may bend the first block A1 into a state shown in FIG. 2, so as to expose a part of the display surface 112 for the user to view and perform a touch operation. Moreover, the user may sense the touch operation performed on the view window 212 by the user via the sensing module 220 (shown in FIG. 4). Under this state, the area of the display surface 112 exposed by the protection cover 200 is greater than that of the view window 212, thereby providing a more comfortable reading state. Moreover, because the second block A2 of the cover body 210 still covers a part of the display surface 112, a picture or information displayed on the display surface 112 can be prevented from being viewed unexpectedly by other people.

Besides, referring to FIG. 3, the protection cover 200 in the present embodiment includes a keyboard module 230, the keyboard module 230 being provided on the cover body 210. When the protection cover 200 covers the main unit 300, the user may input via the touch pad constituted by the keyboard module 230 and the view window 212.

Referring to FIG. 1 and FIG. 4, in particular, the cover body 210 in the present embodiment includes a main body 214 and a light-transmitting plate 216, the main body 214 has an opening 215, and the light-transmitting plate 216 is provided in the opening 215 to constitute the view window 212. The cover body 210 includes two opposite coverage layers 210a, 210b, and the cover body 210 further includes a frame portion 211, the frame portion 211 is provided between the two coverage layers 210a, 210b and surrounds the view window 212, and the light-transmitting plate 216 is fixed in the frame portion 211. In addition, the sensing module 220 is provided between the two coverage layers 210a, 210b.

Further, the opening 215 includes two sensing spaces 216a, 216b located on two opposite sides of the light-transmitting plate 216 respectively, the sensing module 220 being corresponding to the sensing space 216a so as to sense an object 20 in the sensing space 216a.

In the present embodiment, the sensing module 220 is, for example, an infrared sensing module or an ultrasonic sensing module. The frame portion 211 has a slot 211a. The slot 211a aligns with the sensing module 220. The sensing module 220 is suitable for transmitting a sensing signal to the sensing space 216a through the slot 211a to sense the object 20 in the view window 212. In other embodiments, the sensing module 220 may be other types of sensing modules, which will not be limited herein. After detecting a touch signal S1 of the object 20, the sensing module 220 transmits the touch signal S1 to the electronic device 100 by means of electrical connection or wireless transmission.

Figure 5:
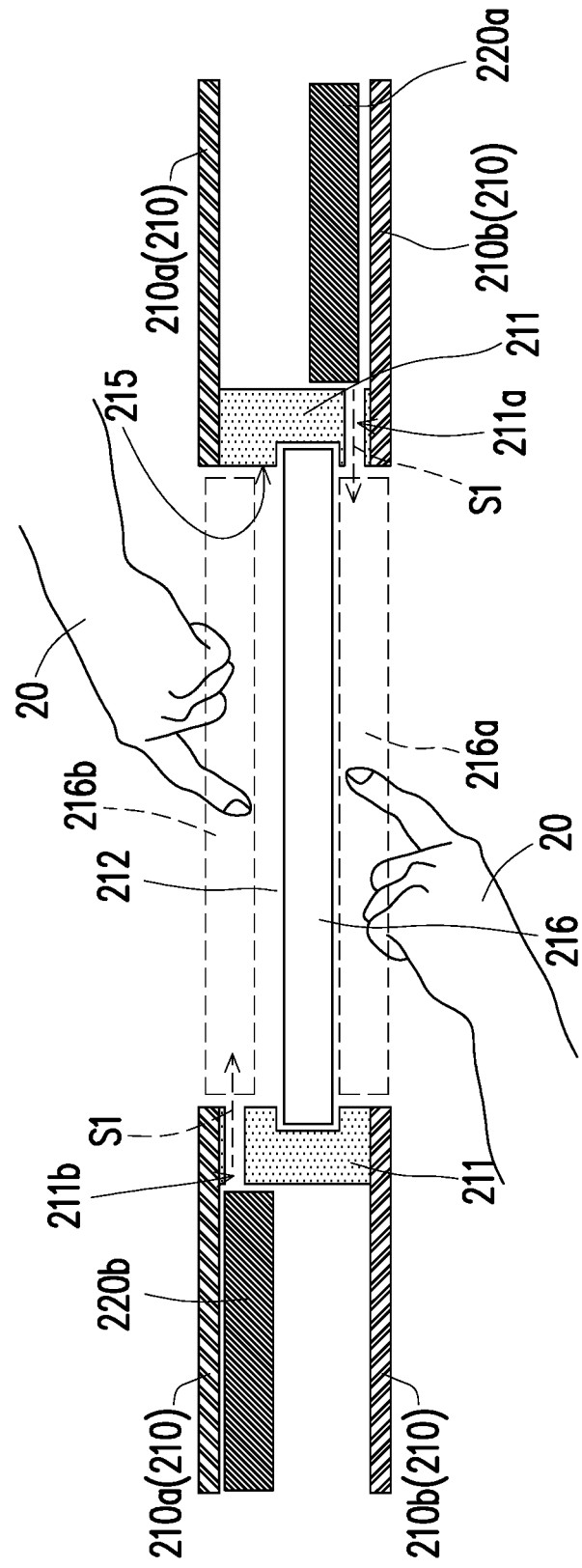
FIG. 5 is a cross-sectional view of a protection cover according to another embodiment of the present invention.

FIG. 5 is a cross-sectional view of a protection cover according to another embodiment of the present invention. Different from the foregoing embodiment, in the present embodiment, two sensing modules 220a, 220b are provided between the two coverage layers 210a, 210b in FIG. 5, and the frame portion 211 has two slots 211a, 211b. When the object 20 enters the two sensing spaces 216a, 216b, signals of the sensing modules 220a, 220b are transmitted to the two slots 211a, 211b, and the touch signal S1 generated by the object 20 is sensed. By providing the two sensing modules 220a, 220b, the user may perform a touch operation on the view window 212 under the state shown in FIG. 2, as well as a touch operation on the view window 212 under the state shown in FIG. 1.

Based on the foregoing, the protection cover in the present invention has a view window and a sensing module corresponding to the view window, so that a user may view information on a display surface of an electronic device through the view window without turning over the protection cover, and a touch operation performed on the view window by the user may be sensed via the sensing module, thereby improving the use convenience of the electronic device.

Although the present invention has been disclosed with the embodiments as above, they are not intended to limit the present invention. Any person skilled in the art may make some variations and modifications without departing from the spirit and scope of the present invention. Therefore, the protection scope of the present invention should be defined by the appended claims.

What is claimed is:

1. A protection cover, applicable to an electronic device, the protection cover comprising:
a cover body, comprising a view window, wherein the cover body is suitable for covering a display surface of the electronic device and exposing a part of the display surface via the view window; and
at least one sensing module, being provided on the cover body and aligning with the view window, wherein the at least one sensing module is suitable for sensing at least one object in the view window to generate a touch signal, and transmitting the touch signal to the electronic device,
wherein the cover body comprises two opposite coverage layers, and the at least one sensing module is provided between the two coverage layers.

2. The protection cover according to claim 1, wherein the at least one sensing module is an infrared sensing module or an ultrasonic sensing module.

3. The protection cover according to claim 1, wherein the cover body comprises a main body and a light-transmitting plate, the main body comprises an opening, and the light-transmitting plate is provided in the opening to constitute the view window.

4. The protection cover according to claim 3, wherein the opening comprises two sensing spaces located on two opposite sides of the light-transmitting plate respectively, and the at least one sensing module is corresponding to at least one of the two sensing spaces.

5. The protection cover according to claim 4, wherein the number of the at least one sensing module is two, and the two sensing modules are corresponding to the two sensing spaces respectively.

6. The protection cover according to claim 1, wherein the cover body further comprises a frame portion, and the frame portion is provided between the two coverage layers and surrounds the view window.

7. The protection cover according to claim 6, wherein the frame portion comprises at least one slot, the at least one slot aligns with the at least one sensing module, and the at least one sensing module is suitable for sensing the at least one object in the view window through the at least one slot.

8. The protection cover according to claim 1, wherein the cover body comprises a first block, a second block and a flexible portion, the flexible portion is connected between the first block and the second block, the view window is located on the first block, and the first block is suitable for bending relative to the second block via the flexible portion and overlapping with the second block.

9. The protection cover according to claim 1, comprising a keyboard module, wherein the keyboard module is provided on the cover body.

10. An electronic apparatus, comprising:
an electronic device, comprising a display surface; and
a protection cover, comprising:
a cover body, comprising a view window, wherein the cover body is suitable for covering the display surface of the electronic device and exposing a part of the display surface via the view window; and
at least one sensing module, being provided on the cover body and aligning with the view window, wherein the at least one sensing module is suitable for sensing at least one object in the view window to generate a touch signal, and transmitting the touch signal to the electronic device,
wherein the cover body comprises two opposite coverage layers, and the at least one sensing module is provided between the two coverage layers.

11. The electronic apparatus according to claim 10, wherein the at least one sensing module is an infrared sensing module or an ultrasonic sensing module.

12. The electronic apparatus according to claim 10, wherein the cover body comprises a main body and a light-transmitting plate, the main body comprises an opening, and the light-transmitting plate is provided in the opening to constitute the view window.

13. The electronic apparatus according to claim 12, wherein the opening comprises two sensing spaces located on two opposite sides of the light-transmitting plate respectively, and the at least one sensing module is corresponding to at least one of the two sensing spaces.

14. The electronic apparatus according to claim 13, wherein the number of the at least one sensing module is two, and the two sensing modules are corresponding to the two sensing spaces respectively.

15. The electronic apparatus according to claim 10, wherein the cover body further comprises a frame portion, and the frame portion is provided between the two coverage layers and surrounds the view window.

16. The electronic apparatus according to claim 15, wherein the frame portion comprises at least one slot, the at least one slot aligns with the at least one sensing module, and the at least one sensing module is suitable for sensing the at least one object in the view window through the at least one slot.

17. The electronic apparatus according to claim 10, wherein the cover body comprises a first block, a second block and a flexible portion, the flexible portion is connected between the first block and the second block, the view window is located on the first block, and the first block is suitable for bending relative to the second block via the flexible portion and overlapping with the second block.

18. The electronic apparatus according to claim 10, wherein the protection cover comprises a keyboard module, and the keyboard module is provided on the cover body.

* * * * *